United States Patent
Wei et al.

(10) Patent No.: US 9,739,937 B2
(45) Date of Patent: Aug. 22, 2017

(54) ELLIPTICAL CLADDING POLARIZATION-MAINTAINING LARGE-MODE-AREA GAIN FIBER

(71) Applicant: WUHAN RUIXIN SPECIAL OPTICAL FIBER CO., LTD., Wuhan (CN)

(72) Inventors: Kanxian Wei, Wuhan (CN); Rui Liu, Wuhan (CN); Xiaotao Hu, Wuhan (CN); You Li, Wuhan (CN); Jianhua Bao, Wuhan (CN); Yunli Li, Wuhan (CN)

(73) Assignee: WUHAN RUIXIN SPECIAL OPTICAL FIBER CO., LTD., Wuhan (CN)

( * ) Notice: Subject to any disclaimer, the term of this patent is extended or adjusted under 35 U.S.C. 154(b) by 0 days.

(21) Appl. No.: 15/125,163

(22) PCT Filed: Jun. 1, 2015

(86) PCT No.: PCT/CN2015/080477
§ 371 (c)(1),
(2) Date: Sep. 10, 2016

(87) PCT Pub. No.: WO2016/192004
PCT Pub. Date: Dec. 8, 2016

(65) Prior Publication Data
US 2017/0176675 A1    Jun. 22, 2017

(51) Int. Cl.
*G02B 6/02*     (2006.01)
*G02B 6/036*    (2006.01)
*G02B 6/44*     (2006.01)
*G02B 6/024*    (2006.01)

(52) U.S. Cl.
CPC .......... *G02B 6/03688* (2013.01); *G02B 6/024* (2013.01); *G02B 6/03694* (2013.01); *G02B 6/4429* (2013.01)

(58) Field of Classification Search
CPC .. G02B 6/3694; G02B 6/3688; G02B 6/4429; G02B 6/024
See application file for complete search history.

(56) References Cited

U.S. PATENT DOCUMENTS

| 5,067,793 A * | 11/1991 | Bachmann | C03B 37/01217 385/11 |
| 2008/0151254 A1* | 6/2008 | Sanders | C03B 37/02709 356/460 |

* cited by examiner

*Primary Examiner* — Sung Pak
*Assistant Examiner* — Hoang Tran
(74) *Attorney, Agent, or Firm* — Platinum Intellectual Property LLP

(57) ABSTRACT

The present invention discloses an elliptical cladding polarization-maintaining large-mode-area gain fiber, structurally comprising a core of the elliptical cladding polarization-maintaining large-mode-area gain fiber, an inner cladding, an elliptical stress layer, a first outer cladding, a second outer cladding and a third outer cladding, wherein the inner cladding surrounds the core; the elliptical stress layer surrounds the inner cladding, and has an elliptical cross-sectional shape; the first outer cladding surrounds the elliptical stress layer; the second outer cladding surrounds the first outer cladding; and the third outer cladding surrounds the second outer cladding. As the birefringence of the elliptical cladding polarization-maintaining fiber is directly proportional to the ellipticity and the deposition of a stress-applying area occurs during the preform rod forming process, procedures of preform drilling and the like are eliminated, and the likelihood of preform contamination is greatly reduced. The optical loss and strength of the fiber can hence be improved, and the entire manufacturing process is simplified. Furthermore, the birefringence and the pump absorption of the fiber can also be improved.

13 Claims, 3 Drawing Sheets

ELLIPTICAL CLADDING POLARIZATION-MAINTAINING LARGE-MODE-AREA GAIN FIBER

FIELD OF THE INVENTION

The present invention relates to the fields of fiber lasers and amplifiers, and particularly relates to an elliptical cladding polarization-maintaining large-mode-area gain fiber.

BACKGROUND OF THE INVENTION

Fiber lasers and amplifiers with double-cladding ytterbium-doped fibers as a gain medium have the characteristics of high output power, high electro-optic conversion efficiency, high beam quality and the like. However, as the requirement for the laser output power continuously increases, a single fiber laser is difficult to meet the application requirement of several kilowatts to hundreds of kilowatts, and the outputs of a plurality of fiber lasers must be combined into a single laser output by a beam combination method. The outputs of a plurality of fiber lasers manufactured by using large-mode-area fibers with polarization-maintaining characteristics can be coherently combined, so that the laser power is greatly improved.

At present, a polarization-maintaining large-mode-area gain fiber generally adopts a panda-type fiber design. Please refer to FIG. 1, which is a structural schematic diagram of a panda-type polarization-maintaining large-mode-area gain fiber. As shown in FIG. 1, the refractive index of a fiber core 1 is higher than that of a fiber cladding 3, and the refractive index of the fiber cladding 3 is higher than that of stress-applying members 2. However, the panda-type polarization-maintaining large-mode-area gain fiber has the following shortcomings: (1) the diameter of a fiber preform rod should be large enough for hole-drilling and rod insertion to accommodate practical size stress rods, and meanwhile, the machining procedures of drilling, polishing and the like add process complexity and may introduce impurities; (2) the refractive index of the stress-applying members is lower than that of the cladding, which only achieves a polarization-maintaining effect but is usually not part of the waveguide design of the core; (3) since helical rays in a circular cladding cannot be absorbed by the core, low pump absorption is resulted; and (4) for the large mode area fiber designs with small cladding-to-core diameter ratios, the physical space for stress-applying members is limited, so is the ability to achieve high birefringence.

Thus, the panda-type polarization-maintaining large-mode-area gain fiber in the prior art has the technical problems of manufacturing complexity, low birefringence and low pump absorption.

SUMMARY OF THE INVENTION

The embodiments of the present invention provide an elliptical cladding polarization-maintaining large-mode-area gain fiber for solving the technical problems of manufacturing complexity, low birefringence and low pump absorption of the panda-type large-mode-area gain polarization-maintaining fiber in the prior art. In one aspect, the embodiments of the present invention provide an elliptical cladding polarization-maintaining large-mode-area gain fiber, comprising:

a core which consists of a silica glass doped with a gain matter and has a first refractive index;

an inner cladding which immediately surrounds the core and has a second refractive index smaller than the first refractive index;

an elliptical stress layer which surrounds the inner cladding and has a third refractive index smaller than or equal to the second refractive index and is elliptical in shape;

a first outer cladding, which surrounds the elliptical stress layer and has a fourth refractive index smaller than or equal to the third refractive index;

a second outer cladding, which surrounds the first outer cladding and has a fifth refractive index smaller than the fourth refractive index; and a third outer cladding, which surrounds the second outer cladding and has a sixth refractive index greater than the fifth refractive index.

Optionally, the gain matter contains rare earth elements, which include at least one of ytterbium, erbium, thulium, holmium and neodymium.

Optionally, the core is further doped with at least one of aluminum, phosphorus, germanium, fluorine and boron.

Optionally, the ellipticity of the elliptical stress layer is 40-60%, and is defined by dividing the difference between the major axis and the minor axis by the sum of the major axis and the minor axis.

Optionally, the inner cladding includes silica glass doped with at least one of germanium, phosphorus, fluorine and aluminum or silica glass.

Optionally, the elliptical stress layer includes silica glass doped with at east one of boron, germanium, phosphorus and fluorine.

Optionally, the first outer cladding includes silica glass doped with at least one of germanium, phosphorus, fluorine and aluminum or silica glass.

Optionally, the second outer cladding includes silica glass doped with fluorine, and the numerical aperture of the first outer cladding relative to the second outer cladding is more than 0.1.

Optionally, the second outer cladding includes a silicone coating, and the numerical aperture of the first outer cladding relative to the second outer cladding is more than 0.3.

Optionally, the second outer cladding includes a fluoroacrylate coating and the numerical aperture of the first outer cladding relative to the second outer cladding is more than 0.35.

Optionally, the third outer cladding includes an acrylate coating.

Optionally, the numerical aperture of the core relative to the inner cladding is 0.04-0.10, the diameter of the core is 8-35 microns, the diameter ratio of the inner cladding to the core is 1.0-6.0, the diameter of the first outer cladding is 125-600 microns, and the thickness of the second outer cladding is not less than 5 microns.

In another aspect, the embodiments of the present invention further provide an elliptical cladding polarization-maintaining large-mode-area gain fiber, comprising:

a core, which includes a silica glass doped with a gain matter and has a first refractive index an elliptical stress layer, which surrounds the core and has a second refractive index smaller than the first refractive index and is elliptical in shape;

a first outer cladding, which surrounds the elliptical stress layer and has a third refractive index smaller than or equal to the second refractive index;

a second outer cladding, which surrounds the first outer cladding and has a fourth refractive index smaller than the third refractive index; and a third outer cladding, which surrounds the second outer cladding and has a fifth refractive index smaller than the fourth refractive index.

One or more technical solutions provided in the embodiments of the present invention at least have the following technical advantages:

1. As the birefringence of the elliptical cladding polarization-maintaining fiber is directly proportional to the ellipticity and the stress-applying area is deposited as part of the preform fabrication process, the diameter of a fiber preform rod is not a limiting factor. There is no need for preform drilling after a preform is made, minimizing the likelihood of preform contamination. This simplifies the fiber making process. High strength and low loss polarization maintaining fiber can be readily achieved.

2. By adopting the elliptical stress layer design, the stress area can be placed in the proximity of the core, so that the birefringence of the elliptical cladding polarization-maintaining large-mode-area gain fiber is improved, particularly for the large-mode-area fiber designs with small cladding-to-core diameter ratios.

3. The elliptical stress layer and the inner cladding can become part of the core waveguide design. By raising the refractive indices of the elliptical cladding and the inner cladding appropriately the numerical aperture of the core is relatively reduced, solving the dilemma of high doping concentration and low numerical aperture. In some cases, the inner cladding can be directly replaced by the elliptical stress cladding, further simplifying fiber design and manufacturing process.

4. The elliptical cladding, immediately surrounding the core, can serve as a pump waveguide in the traditional double-cladding structure and removes the cylindrical symmetry of the pump waveguide, so that the helical rays can be reduced and the pump absorption efficiency can be greatly improved.

DETAILED DESCRIPTION OF THE EMBODIMENTS

The embodiments of the present invention provide an elliptical cladding polarization-maintaining large-mode-area gain fiber for solving the technical problems of manufacturing complexity, low birefringence and low pump absorption of the panda-type polarization-maintaining large-mode-area gain fiber in the prior art. The overall thought of the technical solutions in the embodiments of the present invention for solving the above technical problems is as follows.

Figure 1:
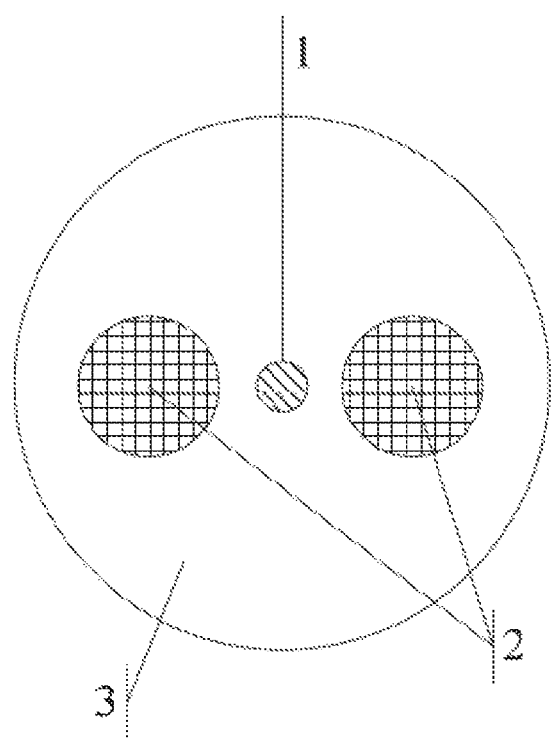
FIG. 1 is a schematic diagram of a panda-type polarization-maintaining large-mode-area gain fiber in the prior art.
Figure 2:
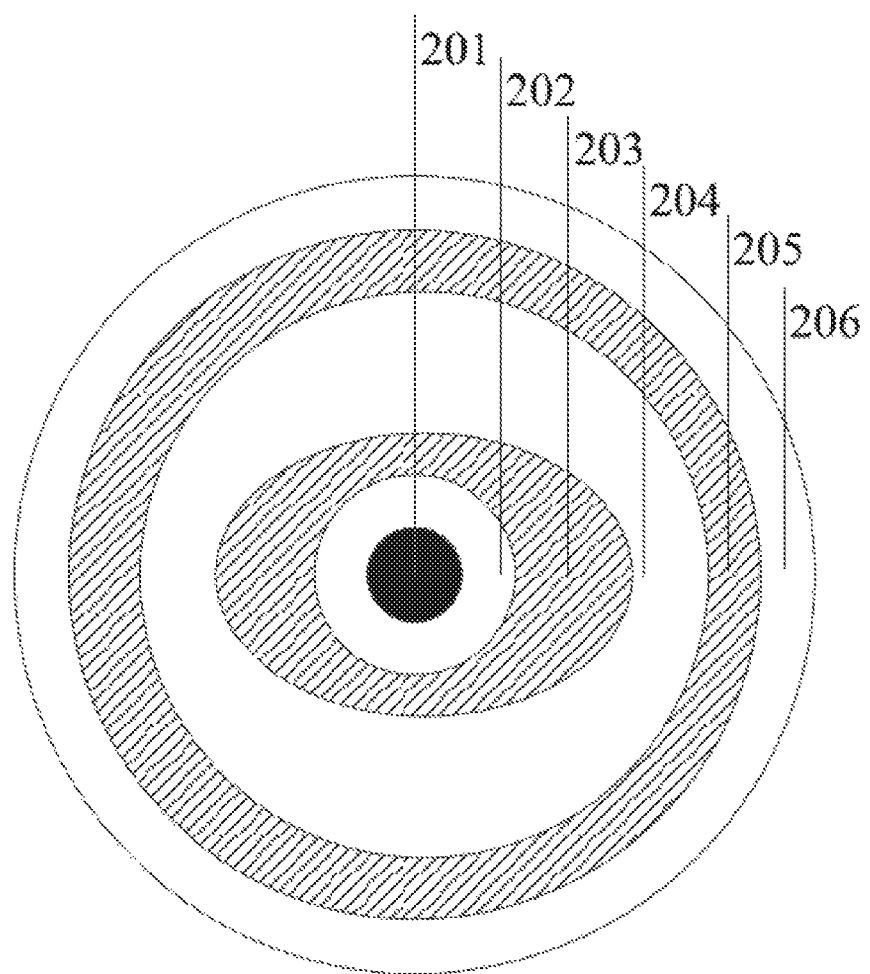
FIG. 2 is a schematic diagram of an elliptical cladding polarization-maintaining large-mode-area gain fiber provided by an embodiment of the present invention.

The embodiments of the present invention provide an elliptical cladding polarization-maintaining large-mode-area gain fiber. Please refer to FIG. 2, which is a schematic diagram of an elliptical cladding polarization-maintaining fiber provided by an embodiment of the present invention. As shown in FIG. 2, the fiber includes:

a core 201 of the elliptical cladding polarization-maintaining large-mode-area gain fiber, which includes a silica glass doped with a gain matter and has a first refractive index;

an inner cladding 202, which surrounds the core 201 and has a second refractive index smaller than the first refractive index;

an elliptical stress layer 203, which surrounds the inner cladding 202 and has a third refractive index and has an elliptical shape;

a first outer cladding 204, which surrounds the elliptical stress layer 203 and has a fourth refractive index;

a second outer cladding 205, which surrounds the first outer cladding 204 and has a fifth refractive index; and a third outer cladding 206, which surrounds the second outer cladding 205 and has a sixth refractive index.

In this embodiment, please continuously refer to FIG. 2. The first refractive index of the core 201 of the elliptical cladding polarization-maintaining large-mode-area gain fiber is greater than the second refractive index of the inner cladding 202, that is, the second refractive index is smaller than the first refractive index; the second refractive index of the inner cladding 202 is greater than or equal to the third refractive index of the elliptical stress layer 203, that is, the third refractive index is smaller than or equal to the second refractive index; the third refractive index of the elliptical stress layer 203 is greater than or equal to the fourth refractive index of the first outer cladding 204, that is, the fourth refractive index is smaller than or equal to the third refractive index; the fourth refractive index of the first outer cladding 204 is greater than the fifth refractive index of the second outer cladding 205, that is, the fifth refractive index is smaller than the fourth refractive index; and the fifth refractive index of the second outer cladding 205 is smaller than the sixth refractive index of the third outer cladding 206, that is, the sixth refractive index is greater than the fifth refractive index.

The calculation formula of birefringence of the elliptical cladding polarization-maintaining fiber is:

$$B_0 = \frac{cE\Delta a\Delta T}{1-v} \frac{r_1 - r_2}{r_1 + r_2} \left[1 - \frac{3}{2}\frac{r_1 r_2 (r_1 + r_2)}{b^3}\right],$$

wherein $B_0$ is birefringence, c is a stress-photo elasticity coefficient, E is an elasticity modulus, v is Poisson's ratio, $\Delta a$ is a linear expansion coefficient difference of a stress area, $\Delta T$ is a difference between the softening temperature of a stress material for the stress area and the room temperature, b is the outer radius of the polarization-maintaining fiber, r1 is the radius of the major axis of the elliptical cladding, and r2 is the radius of the minor axis of the elliptical cladding. It can be seen that as the birefringence of the elliptical cladding polarization-maintaining fiber is directly proportional to the ellipticity, the diameter of a fiber preform rod is not a limiting factor, a stress-applying area only needs to be deposited during a rod forming process, procedures of preform drilling and the like are not needed, then inevitable impurities cannot be introduced into the fiber preform rod, optical loss of the fiber after fiber draw can be reduced, the entire manufacturing process step is simplified, and the quality of the fiber preform rod is improved.

Meanwhile, by adopting the elliptical stress layer design, the elliptical stress layer and the inner cladding can become part of the core waveguide design, so that the birefringence of the elliptical cladding polarization-maintaining largemode-area gain fiber is improved. In addition, the elliptical stress layer not only can achieve a stress effect, but also can achieve an effect of enhancing pump absorption, so that the clad pump absorption is improved, and helical rays are reduced.

In a specific implementation, the gain matter doped in the silica glass of the core 201 of the elliptical cladding polarization-maintaining large-mode-area gain fiber contains rare earth elements, which include at least one of ytterbium, erbium, thulium, holmium and neodymium, and the present invention is not limited thereto.

In a specific implementation, the core 201 of the elliptical cladding polarization-maintaining large-mode-area gain fiber may be further doped with at least one of aluminum, phosphorus, germanium, fluorine and boron besides the gain matter, to ensure or enhance the laser performance of the core 201, which is not redundantly described herein.

In a specific implementation, the ellipticity of the elliptical stress layer 203 is 40-60%, and is defined by dividing the difference between the major axis and the minor axis by the sum of the major axis and the minor axis. Because the birefringence of the elliptical cladding polarization-maintaining large-mode-area gain fiber depends on the design of the elliptical stress area, the ellipticity of the stress area should be increased as much as possible to meet the requirement for birefringence, but increasing the ellipticity may increase the core non-circularity and influence the mode field diameter and the loss of the fiber, an ellipticity of the elliptical stress layer in the range of 40-60% represents a practical trade-off.

In a specific implementation, the inner cladding 202 includes silica glass doped with at least one of germanium, phosphorus, fluorine and aluminum, or silica glass (it should be noted that the silica glass herein is not specially doped with other elements, has the purity meeting the actual requirements and is not limited herein).

In a specific implementation, the elliptical stress layer 203 includes silica glass doped with at least one of boron, germanium, phosphorus and fluorine.

In a specific implementation, the first outer cladding 204 includes silica glass doped with at least one of germanium, phosphorus, fluorine and aluminum or silica glass (it should be noted that the silica glass herein is not specially doped with other elements, has the purity meeting the actual requirements and is not limited herein).

In a specific implementation, the second outer cladding 205 may include silica glass doped with fluorine, and the numerical aperture of the first outer cladding 204 relative to the second outer cladding 205 is more than 0.1.

In another embodiment, the second outer cladding 205 may include a silicone coating, and the numerical aperture of the first outer cladding 204 relative to the second outer cladding 205 is more than 0.3.

In another embodiment, the second outer cladding 205 may include a low refractive index fluoro-acrylate coating, and the numerical aperture of the first outer cladding 204 relative to the second outer cladding 205 is more than 0.35.

In a specific implementation, the third outer cladding 206 may include an acrylate coating, thus achieving the effect of protecting the fiber.

In a specific implementation, the numerical aperture of the core 201 relative to the inner cladding 202 is 0.04-0.10, the diameter of the core is 8-35 microns, the diameter ratio of the inner cladding 202 to the core is 1.0-6.0, the diameter of the first outer cladding 204 is 125-600 microns, and the thickness of the second outer cladding 205 is not less than 5 microns.

Figure 3:
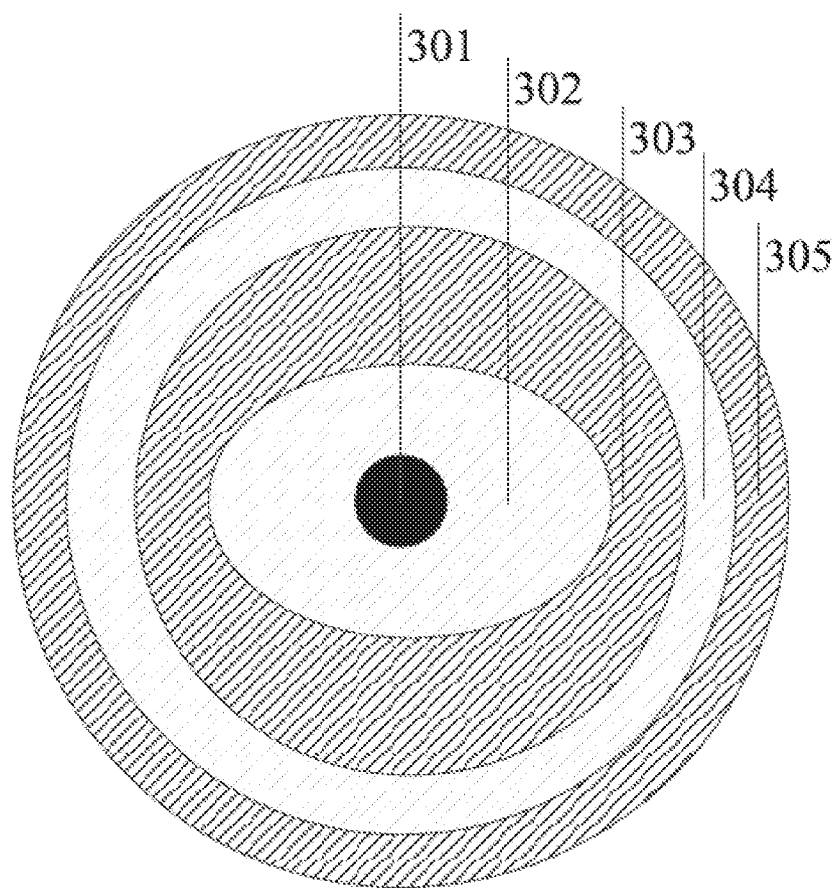
FIG. 3 is a schematic diagram of another elliptical cladding polarization-maintaining large-mode-area gain fiber provided by an embodiment of the present invention.

Please refer to FIG. 3, which is a schematic diagram of another elliptical cladding polarization-maintaining large-mode-area gain fiber provided by an embodiment of the present invention. As shown in FIG. 3, the elliptical cladding polarization-maintaining large-mode-area gain fiber includes:

a core 301 of the elliptical cladding polarization-maintaining large-mode-area gain fiber, which includes a silica glass doped with a gain matter and has a first refractive index;

an elliptical stress layer 302, which surrounds the core 301, has a second refractive index smaller than the first refractive index and has an elliptical shape;

a first outer cladding 303, which surrounds the elliptical stress layer 302 and has a third refractive index smaller than or equal to the second refractive index;

a second outer cladding 304, which surrounds the first outer cladding 303 and has a fourth refractive index smaller than the third refractive index; and a third outer cladding 305, which surrounds the second outer cladding 304 and has a fifth refractive index smaller than the fourth refractive index.

In this embodiment, the elliptical stress layer directly replaces the inner cladding of the fiber and its refractive index is appropriately raised, so that the fiber design is simplified and the numerical aperture of the core is relatively reduced, allowing low core numerical aperture fiber designs with high doping concentrations.

It should be noted that the core 301, the elliptical stress layer 302, the first outer cladding 303, the second outer cladding 304 and the third outer cladding 305 in this embodiment may be respectively the same as the core 201, the elliptical stress layer 203, the first outer cladding 204, the second outer cladding 205 and the third outer cladding 206 described in the aforementioned embodiment. Since the core 301, the elliptical stress layer 203, the first outer cladding 204, the second outer cladding 205 and the third outer cladding 206 are described in detail in the aforementioned embodiment, they are not redundantly described herein for the purpose of compactness of the specification.

One or more technical solutions provided in the embodiments of the present invention at least have the following technical advantages:

1. As the birefringence of the elliptical cladding polarization-maintaining fiber is directly proportional to the ellipticity and the stress-applying area is deposited as part of the preform fabrication process, the diameter of a fiber preform rod is not a limiting factor. There is no need for preform drilling after a preform is made, minimizing the likelihood of preform contamination. This simplifies the fiber making process. High strength and low loss polarization maintaining fiber can be readily achieved.

2. By adopting the elliptical stress layer design, the stress area can be placed in the proximity of the core, so that the birefringence of the elliptical cladding polarization-maintaining large-mode-area gain fiber is improved, particularly for the large-mode-area fiber designs with small cladding-to-core diameter ratios.

3. The elliptical stress layer and the inner cladding can become part of the core waveguide design. By raising the refractive indices of the elliptical cladding and the inner cladding appropriately the numerical aperture of the core is relatively reduced, solving the dilemma of high doping concentration and low numerical aperture. In some cases, the inner cladding can be directly replaced by the elliptical stress cladding, further simplifying fiber design and manufacturing process.

4. The elliptical cladding, immediately surrounding the core, can serve as a pump waveguide in the traditional double-cladding structure and removes the cylindrical symmetry of the pump waveguide, so that the helical rays can be reduced and the pump absorption efficiency can be greatly improved.

Obviously, various changes and modifications can be made by those skilled in the art without departing from the spirit and scope of the present invention. If these changes and modifications of the present invention fall into the scope of the claims of the present invention and the equivalent technologies thereof, the present invention also intends to include these changes and modifications.

The invention claimed is:

1. An elliptical cladding polarization-maintaining large-mode-area gain fiber, comprising:
   a core of the elliptical cladding polarization-maintaining large-mode-area gain fiber, which comprises a silica glass doped with a gain matter and has a first refractive index;
   an inner cladding, which surrounds the core and has a second refractive index smaller than the first refractive index;
   an elliptical stress layer, which surrounds the inner cladding, has a third refractive index smaller than or equal to the second refractive index and has an elliptical cross-sectional shape;
   a first outer cladding, which surrounds the elliptical stress layer and has a fourth refractive index smaller than or equal to the third refractive index;
   a second outer cladding, which surrounds the first outer cladding and has a fifth refractive index smaller than the fourth refractive index; and
   a third outer cladding, which surrounds the second outer cladding and has a sixth refractive index greater than the fifth refractive index.

2. The fiber of claim 1, wherein the gain matter contains rare earth elements, which comprise at least one of ytterbium, erbium, thulium, holmium and neodymium.

3. The fiber of claim 1, wherein the core is further co-doped with at least one of aluminum, phosphorus, germanium, fluorine and boron.

4. The fiber of claim 1, wherein the ellipticity of the elliptical stress layer is 40-60%, and the ellipticity is defined by dividing the difference between the major axis and the minor axis by the sum of the major axis and the minor axis.

5. The fiber of claim 1, wherein the inner cladding comprises silica glass doped with at least one of germanium, phosphorus, fluorine and aluminum or silica glass.

6. The fiber of claim 1, wherein the elliptical stress layer comprises silica glass doped with at least one of boron, germanium, phosphorus and fluorine.

7. The fiber of claim 1, wherein the first outer cladding comprises silica glass doped with at least one of germanium, phosphorus, fluorine and aluminum or silica glass.

8. The fiber of claim 1, wherein the second outer cladding comprises silica glass doped with fluorine, and the numerical aperture of the first outer cladding relative to the second outer cladding is more than 0.1.

9. The fiber of claim 1, wherein the second outer cladding comprises a silicone coating, and the numerical aperture of the first outer cladding relative to the second outer cladding is more than 0.3.

10. The fiber of claim 1, wherein the second outer cladding comprises a low refractive index fluoro-acrylate coating, and the numerical aperture of the first outer cladding relative to the second outer cladding is more than 0.35.

11. The fiber of claim 1, wherein the third outer cladding comprises auv-curable acrylate coating.

12. The fiber of claim 1, wherein the numerical aperture of the core relative to the inner cladding is 0.04-0.10, the diameter of the core is 8-35 microns, the diameter ratio of the inner cladding to the core is 1.0-6.0, the diameter of the first outer cladding is 125-600 microns, and the thickness of the second outer cladding is not less than 5 microns.

13. An elliptical cladding polarization-maintaining large-mode-area gain fiber, comprising:
   a core of the elliptical cladding polarization-maintaining large-mode-area gain fiber, which comprises silica glass doped with a gain matter and has a first refractive index;
   an elliptical stress layer, which surrounds the core, has a second refractive index smaller than the first refractive index and has an elliptical cross-sectional shape;
   a first outer cladding, which surrounds the elliptical stress layer and has a third refractive index smaller than or equal to the second refractive index;
   a second outer cladding, which surrounds the first outer cladding and has a fourth refractive index smaller than the third refractive index; and
   a third outer cladding, which surrounds the second outer cladding and has a fifth refractive index smaller than the fourth refractive index.

* * * * *